United States Patent [19]
Webster et al.

[11] 3,760,884
[45] Sept. 25, 1973

[54] TINE FOR ROTARY SPADER

[75] Inventors: J. Vincent Webster; Douglas D. Dankel, Kankakee, Ill.

[73] Assignee: Roper Corporation, Kankakee, Ill.

[22] Filed: Jan. 10, 1972

[21] Appl. No.: 216,374

[52] U.S. Cl. .................. 172/555, 172/60, 172/123, 172/540
[51] Int. Cl. ...................... A01b 33/10, A01b 33/02
[58] Field of Search................. 172/42, 123, 540, 172/555, 556, 43, 60

[56] References Cited
UNITED STATES PATENTS

| | | | |
|---|---|---|---|
| 2,168,733 | 8/1939 | Dufour................................ | 172/556 |
| 2,663,241 | 12/1953 | Howard ............................... | 172/556 |
| 2,847,924 | 8/1958 | Quick .................................. | 172/555 |
| 2,943,687 | 7/1960 | Merry et al. ...................... | 172/123 X |
| 3,151,685 | 10/1964 | Field ................................... | 172/556 |
| 3,545,549 | 12/1970 | van der Lely et al.............. | 172/42 X |

FOREIGN PATENTS OR APPLICATIONS

| | | | |
|---|---|---|---|
| 1,075,881 | 2/1960 | Germany ............................ | 172/556 |
| 660,236 | 2/1964 | Italy.................................... | 172/123 |

Primary Examiner—Robert E. Pulfrey
Assistant Examiner—Paul T. Sewell
Attorney—C. Frederick Leydig et al.

[57] ABSTRACT

A tine for a rotary spader which is intended for mounting on a horizontal drive shaft as one of a plurality of units spaced end-to-end distinguished by a flat body, a set of four blades of dog-leg shape presenting a sharpened leading edge and with each blade having a straight tip portion which is angled retreatingly to produce a swastika-like shape. The blades and body are formed integrally of a single plate of metal and each top portion is bent over at an angle along a bending line which is generally perpendicular to the tip axis, adjacent blades being bent in opposite directions.

1 Claim, 5 Drawing Figures

PATENTED SEP 25 1973  3,760,884

3,760,884

TINE FOR ROTARY SPADER

Efforts have been made in the past to make a tine for a rotary spader of integral construction, with the blades integral with a flat body, for purposes of economy. However, such tines have not provided optimum digging characteristics. It is accordingly an object of the present invention to provide an improved tine for a rotary spader which combines the benefits of economical integral construction with high digging efficiency.

It is a more specific object of the invention to provide a tine for a rotary spader in which the tine blades are integral with the body and which digs cleanly under a wide variety of soil conditions all the way from dry friable soils to soils of wet clayey consistency with good scouring action. It is a related object of the invention to provide a tine for a rotary spader which stays remarkably free of fibrous materials either in the form of root structure or in the form of weed stems or ground litter in an area being tilled from a virgin or overgrown state. In this connection it is an object to provide a tine for a rotary spader which is highly effective in chopping weeds and ground litter into small pieces incapable of winding about the blades or drive shaft; in short, it is an object of the invention to provide a tine having integral blades which are largely self-cleaning even under the most difficult conditions.

It is still another object to provide a tine assembly for a rotary spader in which each tine has a relatively large horizontal span, enabling the tines to be spaced relatively widely apart thereby to prevent jamming by rocks, clumps of soil or the like between them and which is highly economical, permitting a minimum number of tines to be employed in cooperation per unit width.

It is yet another object of the present invention to provide a tine having integral blades lying in planes which are angled with respect to the tine body and tine axis and which are open faced for clean cutting action combined with efficient dispersal of the loosened soil.

It is an object of the invention in one of its aspects to provide a tine in which the blades are formed integrally with a flat body and which permits a high degree of economy and minimum wastage of metal in the stamping of the tines from a continuous metal strip.

Other objects and advantages of the invention will become apparent upon reading the attached detailed description and upon reference to the drawings in which.

While the invention has been described in connection with a preferred embodiment, it will be understood that we do not intend to be limited to such embodiment but intend, on the contrary, to cover the various alternatives which may be included within the spirit and scope of the appended claims.

Figure 1:
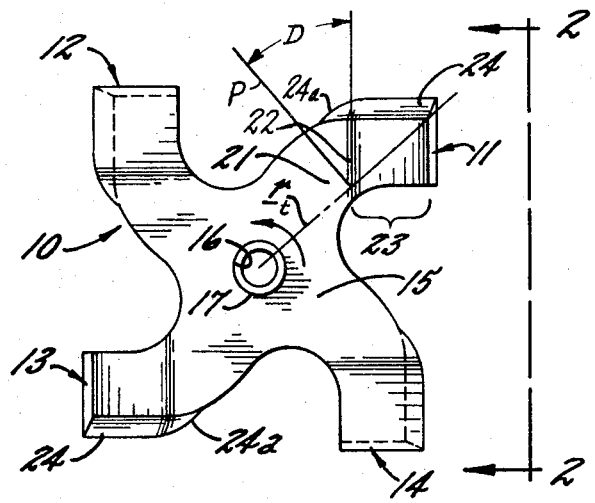
FIG. 1 is an axial end view of a tine constructed in accordance with the present invention looking along the line 1—1 in FIG. 2.

Turning now to FIG. 1 there is shown a tine 10 having blades 11, 12, 13 and 14 formed integrally with a flat body 15. The body has a central, axial opening 16 through which a hub 17 extends which is of cylindrical shape and which is welded to the body, either by spot welding or by a continuous weld, at the joint 18. Transverse openings 19 at the ends of the hub permit pinning to a horizontal drive shaft 20. In accordance with the present invention, each of the blades has a base portion which extends from the body radially as well as a straight tip portion which is angled retreatingly with respect to a radial line to produce a swastika-like shape. Taking the blade 11 by way of example, it has a base portion 21 having a concentrated region or "line" of bending 22 (see also FIG. 5) to provide a straight tip portion 23. The tip portion is sharpened into chisel shape along its leading edge as indicated at 24, with the sharpening being extended slightly inwardly, beyond the line of bend 22, into the adjacent portion of the blade as indicated at 24a. The line of bend 22 is, as will be noted in the drawing, generally perpendicular to the tip axis 25 and alternate blades are bent in opposite directions.

Figure 5:
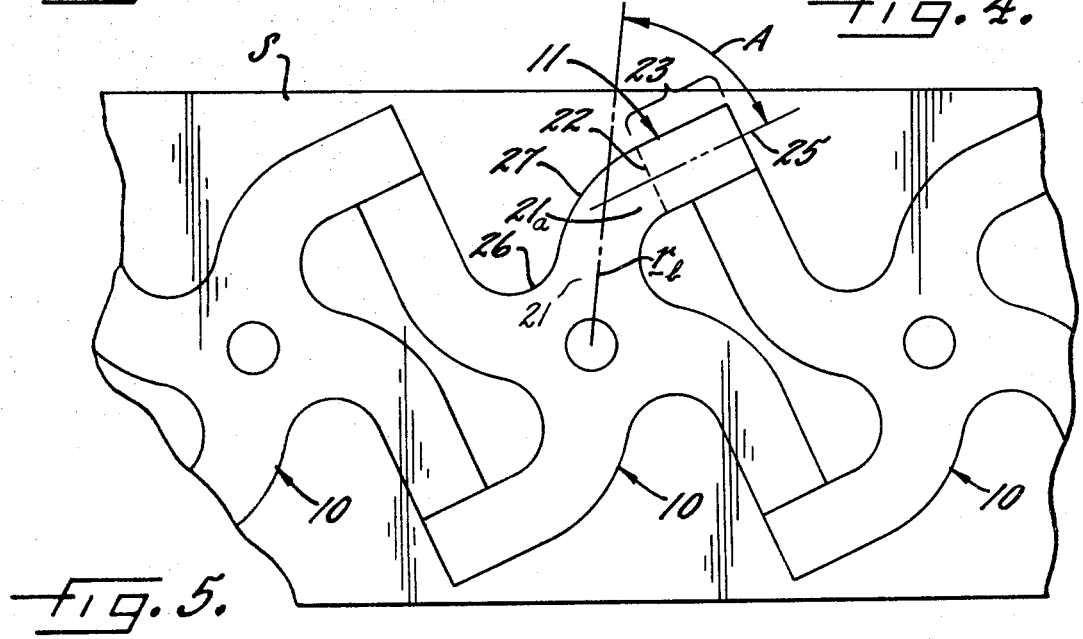
FIG. 5 shows one manner in which the tine blanks may be stamped in interfitting relation from a continuous strip of metal.

The geometric shape of the tine may be more readily appreciated by reference to FIG. 5 which is a diagram showing how a succession of tines 10 may be punched out, in interfitting relation, from a strip of metal S of apprpriate thickness which may, for example, be on the order of three-sixteenths inch. Referring to the central tine shown in that figure it will be noted that the base portion 21 of the blade 11 starts out radially from the blank in alinement with a radius indicated at $r_b$. The base portion 21 of the blade does not, however, proceed straight outwardly but merges with a curved portion 21a which in turn merges with the straight tip portion 23 so that the latter is retreatingly angled with respect to such radius. The angle of retreat, indicated at A in FIG. 5, between the radius $r_b$ and the axis 25 of the tip, is preferably on the order of 52°.

While there is a relatively deep indentation 26 between adjacent blades, the angle of retreat produces a shallow, curved "shedding" edge portion 27 which tends to shed weed stems, roots and other fibrous material so that it does not tend to catch upon the base portions of the blades or wind about the hub.

Figure 3:
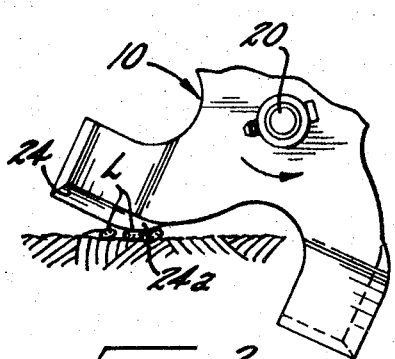
FIG. 3 is a fragmentary view showing the tine in contact with the earth in the act of chopping ground litter.

The shed fibers, traveling radially outwardly, pass to the cutting edge of the blade and are severed as the blade next takes a bite into the ground surface. By extending the cutting edge 24 slightly inwardly beyond the bend line as indicated at 24a, the flat body portion of the blade is enabled to perform a clean slicing action which is particularly effective upon ground litter L as shown in FIG. 3, the surface of the ground serving as a backstop or anvil as the litter is being acted upon.

Figure 2:
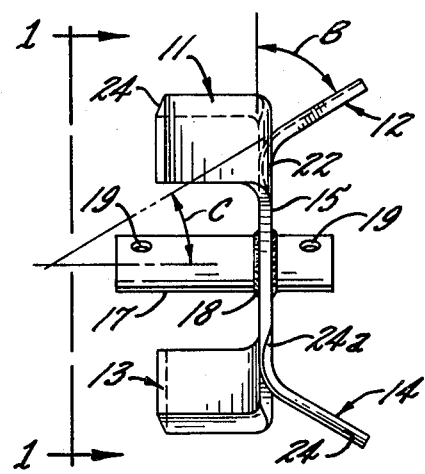
FIG. 2 is a side elevational view of the tine looking along the line 2—2 in FIG. 1.

It is one of the features of the present construction that the flat integral tip portions 23 of the blades are bent out of the plane of the body and forwardly cocked so as to produce clean cutting action combined with an open face and efficient dispersal of the loosened soil. Thus, as shown in FIG. 2, each blade is bent from the plane of the body by a substantial, but acute, angle B, which in a practical case, may be on the order of 60°. The plane of the blade thus bears an angle C with respect to the tine axis, on the order of 30°. By reason of the dog-leg shape of each of the blades and the fact that it is bent along a bend line generally perpendicular to the tip axis, each blade tip is cocked into an open-faced position in which the blade bears a substantial angle $D$ with respect to a perpendicular P to the radius $r_t$ which is drawn to the extreme tip region of the blade. It is preferred that the forward cocking angle of the blade tips, as shown in this figure, be on the order of 40°. Where this angle is slightly less than this amount a shallower cut will be taken (dependent, in addition, upon the sharpening bevel), whereas when the angle is at least about 40°, there is a relatively large area presented to the loose soil causing it to be thrown clear of the region of cutting and thus clearing the field so unproductive churning action is minimized. A cocking angle $D$ on the order of 40°, as shown, has been found to achieve both clean cutting and efficient dispersal.

Figure 4:
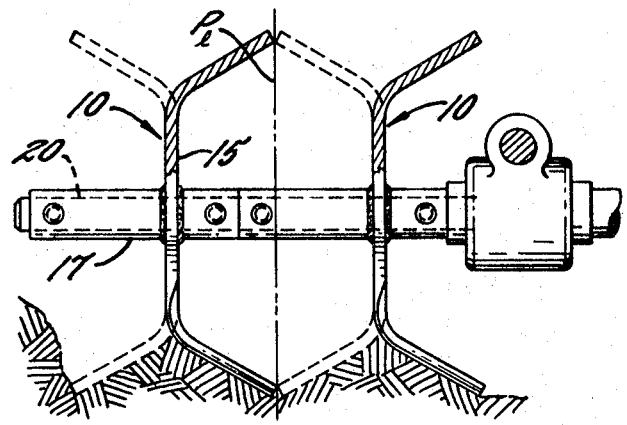
FIG. 4 shows the cutting profile of the tine shown in the preceding figures.

While the invention is not limited to any particular length for the tip portion 23 of the blades, it is preferred that such tip portion have a length which is a major fraction of the minimum radius of the bent-over tip portion of the blade. For example, where the minimum radius of the tip portion is on the order of 4 inches, the tip portion may have a straight length on the order of 3 inches or even 3½ inches. The width, as seen from the drawing, for example FIG. 5, is two-thirds of this amount, which comes out to 2 inches or slightly more. Such dimensions, combined with a large angle of bending from the body, indicated at B in FIG. 2 causes each blade to span a rather wide profile while presenting a wide face to the earth. Thus, where the adjacent tines are mounted upon a drive shaft 20 so that the tips of adjacent blades extend substantially to a common plane P (FIG. 4), the tines may be relatively widely spaced so as to reduce the likelihood that large rocks or clumps of soil which may be encountered will tend to wedge between the flat body portions of the blades, with the result that the blades not only are self-shedding with respect to fibrous materials but are self-shedding in all respects.

While it is preferred to sharpen the blades by beveling them internally, in the direction shown, to provide chisel-like engagement, the sharpening may be produced by beveling on the outwardly facing surface thereby to produce a blade which tends to be self-sharpening when used for long intervals of time. The basic tine structure permits either type of sharpening; the blades can be bent with respect to the body so that the bevel is on the inside, for chiseling engagement, or may be bent with respect to the body in the opposite direction so that the bevel is on the outside to achieve the self-sharpening action.

After the blades have been stamped from a strip of metal S they may be sharpened preferably by a forging operation without loss of metal, rather than by grinding. The blade tips may then be bent over along regions of bend 22 to the prescribed angle. The blade portions of the tines may then be heat treated to develop the requisite degree of hardness and the hub 17 may then, using a simple jig or fixture, be welded in place. The manufacturing steps are extremely simple and may be automated on a high production basis. Since the blades are integral with the tine, the only assembly operation is the welding of the hub in place and the usual man hours spent in the assembling of a multi-part tine may be saved resulting in a high degree of economy and a resultant low price in the marketplace. Also the omission of "hardware" usually required in fastening a blade to a tine body and the inherently thin body structure reduce the amount of energy which must be expended in frictional churning of the soil, and more energy is thus available for cutting and dispersal of the loosened soil. By terminating the bevel or sharpening in the region shown in the drawing, there is no "forging hump" due to displacement of the metal produced along the curved edge 27, which edge is preferably kept blunt, i.e., unbeveled, and smoothly continuous, as shown.

While the generic term "rotary spader" has been used above to refer to the type of equipment to which the tine construction is applicable, it is particularly useful for devices sold under the trademark "ROTO-TILLER."

We claim:

1. A tine for use with a rotary spader having a horizontal drive shaft with means for mounting a plurality of tines axially spaced thereon comprisng, in combination, a flat body having an axial opening, a tubular hub having an external diameter fitted into the opening and secured therein and an internal diameter dimensioned to telescope over the drive shaft, the hub having means for keying to the drive shaft, four blades integral with the flat body, each blade being formed in a dog-leg shape and defined by substantially parallel side edges to form a swastica-like profile, each blade having a base portion in the region of the hub smoothly merging with a curved intermediate portion in the plane of the body defining a backwardly swept leading edge terminating in a straight and flat tip portion, the curve of the intermediate portion being such that the tip portion prior to bending bears a retreat angle of substantially 52° with respect to a radius which is centered with respect to the base portion, the straight tip portion of each blade being bent out of the plane of the body along a bend line by an angle of substantially 60°, the tips of adjacent blades being bent symmetrically in opposite directions, each tip portion being sharpened along its leading edge but with the adjacent intermediate portion being left unsharpened along substantially its entire length, the line of bending bearing an angle on the order of 40° with respect to a perpendicular drawn to a radial line extending from the axis to the region of the extreme tip of the blade thereby to define a relatively open face at the tip portion of each blade.

* * * * *